(12) United States Patent
Matsuzawa et al.

(10) Patent No.: US 11,009,878 B2
(45) Date of Patent: May 18, 2021

(54) AUTONOMOUSLY NAVIGATING VEHICLE

(71) Applicant: HONDA MOTOR CO., LTD., Tokyo (JP)

(72) Inventors: Kohei Matsuzawa, Wako (JP); Atsushi Moroi, Wako (JP); Takahide Konchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 320 days.

(21) Appl. No.: 16/317,154

(22) PCT Filed: Nov. 30, 2016

(86) PCT No.: PCT/JP2016/085506
§ 371 (c)(1),
(2) Date: Jan. 11, 2019

(87) PCT Pub. No.: WO2018/100659
PCT Pub. Date: Jun. 7, 2018

(65) Prior Publication Data
US 2019/0310641 A1     Oct. 10, 2019

(51) Int. Cl.
*G05D 1/02*      (2020.01)
*A01D 34/64*   (2006.01)
(Continued)

(52) U.S. Cl.
CPC ............. *G05D 1/02* (2013.01); *A01D 34/008* (2013.01); *A01D 34/64* (2013.01); *A01D 34/81* (2013.01);
(Continued)

(58) Field of Classification Search
CPC ...... A01D 34/64; A01D 34/81; A01D 34/008; A01D 34/82; A01D 67/00; B62D 27/04; B62D 24/04; B60G 99/002; G05D 1/02
See application file for complete search history.

(56) References Cited

U.S. PATENT DOCUMENTS 2,335,054 A * 11/1943 Godwin ................. A01D 34/42
56/15.3
5,163,273 A * 11/1992 Wojtkowski ......... A01D 34/008
56/11.9
(Continued)

FOREIGN PATENT DOCUMENTS

JP        8-263137 A     10/1996
JP     2002-318618 A     10/2002
(Continued)

OTHER PUBLICATIONS

International Search Report (PCT/ISA/210) issued in PCT/JP2016/085506, dated Dec. 27, 2016.

*Primary Examiner* — Abigail A Risic
(74) *Attorney, Agent, or Firm* — Birch, Stewart, Kolasch & Birch, LLP (57) ABSTRACT

A suspension mechanism has a tube member that is movably attached to an attachment shaft and includes an outer peripheral surface of approximately hemispherical shape, a first attachment shaft retaining member provided on the chassis to swingably retain the attachment shaft with an outer peripheral surface of the tube member abutted on its inside surface, a shaft lower end portion of slip surface shape provided at lowermost part of the attachment shaft, a second attachment shaft retaining member provided on the chassis below the first attachment shaft retaining member and having a vertex equivalent section of approximately conical shape and a slope equivalent section to retain the attachment shaft with the slip surface shape shaft lower end portion abutted onto the vertex equivalent section or the slope equivalent section, and a biasing member that biases the tube member and the shaft lower end portion away from each other.

8 Claims, 5 Drawing Sheets

(51) Int. Cl.

| | | |
|---|---|---|
| *A01D 34/81* | (2006.01) | |
| *B62D 27/04* | (2006.01) | |
| *A01D 34/00* | (2006.01) | |
| *B62D 24/04* | (2006.01) | |
| *B60G 99/00* | (2010.01) | |
| *A01D 34/82* | (2006.01) | |
| *A01D 67/00* | (2006.01) | |

(52) U.S. Cl.
CPC ........... *A01D 34/82* (2013.01); *B60G 99/002* (2013.01); *B62D 24/04* (2013.01); *B62D 27/04* (2013.01); *A01D 67/00* (2013.01)

(56) References Cited

U.S. PATENT DOCUMENTS

| | | | | |
|---|---|---|---|---|
| 2010/0306932 | A1* | 12/2010 | Schneider | G05D 1/0227 |
| | | | | 15/3 |
| 2014/0373497 | A1* | 12/2014 | Bjorn | A01D 34/008 |
| | | | | 56/10.2 R |
| 2018/0116109 | A1* | 5/2018 | Matsumoto | A01D 34/008 |
| 2018/0222528 | A1* | 8/2018 | Jagenstedt | B62D 63/04 |
| 2018/0271014 | A1 | 9/2018 | Matsuzawa et al. | |
| 2019/0310641 | A1* | 10/2019 | Matsuzawa | A01D 34/82 |
| 2020/0000028 | A1* | 1/2020 | Matsuzawa | A01D 34/64 |
| 2020/0170186 | A1* | 6/2020 | Curtis | F16H 25/20 |
| 2020/0315087 | A1* | 10/2020 | Svensson | A01D 34/008 |
| 2020/0367428 | A1* | 11/2020 | Olsson | A01D 75/18 |

FOREIGN PATENT DOCUMENTS

| | | |
|---|---|---|
| JP | 2010-049577 A | 3/2010 |
| WO | WO 2017/109879 A1 | 6/2017 |

* cited by examiner

AUTONOMOUSLY NAVIGATING VEHICLE

TECHNICAL FIELD

This invention relates to an autonomously navigating vehicle, particularly to an autonomously navigating vehicle equipped with a suspension mechanism for connecting a chassis and a cover.

BACKGROUND ART

An autonomously navigating vehicle of this type is equipped with a suspension mechanism that displaceably connect a chassis and a cover, and the present applicant also earlier proposed one in Patent Document 1.

According the technology described in Patent Document 1, a suspension mechanism is interposed in gravity axis direction between a chassis and a cover, and is attached to a lock member of the cover at one end and provided at another end with at least one attachment shaft to be attached to the chassis.

More specifically, according the technology described in Patent Document 1, the configuration comprises, in addition to the attachment shaft, a converter attached thereto for converting force acting on the attachment shaft to horizontal motion orthogonal to gravity axis direction.

PRIOR ART DOCUMENT

Patent Document

Patent Document 1: International Patent Application No. PCT/JP2015/85956

SUMMARY OF THE INVENTION

Problem to be Solved by the Invention

As stated above, the technology of Patent Document 1 is configured to connect a chassis and a cover to in an autonomously navigating vehicle through a suspension mechanism.

The object of this invention, which is the same as that of Patent Document 1, is to provide an autonomously navigating vehicle wherein a chassis and a cover are connected through a suspension mechanism.

Means for Solving the Problem

In order to overcome the problem, this invention provides an autonomously navigating vehicle equipped with a chassis, a cover, and a suspension mechanism interposed between the chassis and the cover through a lock member at one end, and having at least an attachment shaft attached to the chassis at other end, which vehicle runs on drive wheels attached to the chassis, characterized in that: the suspension mechanism (80) comprising: a tube member that is movably attached to the attachment shaft and includes an outer peripheral surface of approximately hemispherical shape; a first attachment shaft retaining member having an inside surface of approximately hemispherical shape surface in side view and provided on the chassis to swingably retain the attachment shaft with the outer peripheral surface of the tube member abutted on the inside surface; a shaft lower end portion of approximately slip surface shape provided at lowermost part of the attachment shaft; a second attachment shaft retaining member provided on the chassis below the first attachment shaft retaining member and having an inside surface formed by a vertex equivalent section of approximately conical shape and the slope equivalent section continuous with the vertex equivalent section to retain the attachment shaft with the shaft lower end portion abutted onto at least one of the vertex equivalent section the slope equivalent section; and a biasing member elastically interposed between the tube member and the shaft lower end portion to bias the tube member and the shaft lower end portion away from each other.

Effects of the Invention

In the autonomously navigating vehicle according to this invention, it is configured such that a suspension mechanism has a tube member that is movably attached to an attachment shaft and includes an outer peripheral surface of approximately hemispherical shape, a first attachment shaft retaining member provided on the chassis to swingably retain the attachment shaft with an outer peripheral surface of the tube member abutted on its inside surface, a shaft lower end portion of slip surface shape provided at lowermost part of the attachment shaft, a second attachment shaft retaining member provided on the chassis below the first attachment shaft retaining member and having a vertex equivalent section of approximately conical shape and a slope equivalent section to retain the attachment shaft with the slip surface shape shaft lower end portion abutted onto the vertex equivalent section or the slope equivalent section, and a biasing member that biases the tube member and the shaft lower end portion away from each other, by which configuration the chassis and the cover can be reliably connected through the suspension mechanism and retaining performance of the attachment shaft can be enhanced.

Moreover, a configuration is adopted wherein the biasing member that elastically biases the tube member and the shaft lower end portion away from each other abuts the shaft lower end portion of slip surface shape onto one or the other of the vertex equivalent section and the slope equivalent section, normally onto the vertex equivalent section, thereby retaining the attachment shaft, which configuration effectively inhibits vibration of the cover and enables reduction of vehicle running noise.

Moreover, since displacement of the cover moves the shaft lower end portion obliquely upward along the slope equivalent section while compressing the biasing member, cushioning performance at time of collision is enhanced, and restoring force can be promptly obtained during ensuing restoration because the shaft lower end portion moves obliquely downward along the slope under gravitational force and reaction force of the biasing member.

MODE FOR CARRYING OUT THE INVENTION

Reference number 10 appearing in FIG. 1 and other drawings designates an autonomously navigating vehicle (hereinafter called "vehicle"). The vehicle 10 is actually implemented as a lawnmower. A body 12 of the vehicle 10 comprises a chassis (body frame) 12a and a cover 12b displaceably attached to the chassis.

The vehicle 10 is equipped with two front wheels 14 of relatively small diameter fixed by stays 12c to left and right sides of the chassis 12a toward its front end in the forward-rearward direction, and with left and right rear wheels 16 of relatively large diameter directly attached to the chassis 12a toward its rear end.

A blade for lawnmower (work unit, specifically rotary blade) 20 is attached to near the middle part of the chassis 12a of the vehicle 10, and an electric motor (prime mover; hereinafter called "work motor") 22 is installed above the blade 20. The blade 20 is connected to the work motor 22 and is rotationally driven by the work motor 22.

A blade height regulating mechanism 24 manually operable by a user is connected to the blade 20. The blade height regulating mechanism 24 is equipped with a handle and configured to enable the user to regulate vertical height of the blade 20 from ground surface GR by manually turning the handle.

Two electric motors (prime movers; hereinafter called "propulsion motors") 26L and 26R are attached to the chassis 12a of the vehicle 10 rearward of the blade 20. The propulsion motors 26L and 26R are connected to the left and right rear wheels 16 and, with the front wheels 14 operating as free wheels, the rear wheels 16, operating as driven wheels, are rotated independently on the left and right sides either normally (rotate to move forward) or reversely (rotate to move backward). The blade 20, work motor 22, propulsion motors 26 and other components are covered by the cover 12b.

In this embodiment, the vehicle 10 is of such weight and size as to be portable by the user. For example, the vehicle 10 has a total length (forward-rearward direction length) of about 71 cm, total width of about 55 cm, and height of about 30 cm.

An onboard charging unit 30 and an onboard battery 32 connected thereto are housed at the rear of the utility vehicle 10, and two battery charging terminals 34 are attached to the chassis 12a so as to project forward from a front end position. The battery charging terminals 34 are connected to the onboard charging unit 30. The work motor 22 and propulsion motors 26 are also connected to and powered by the onboard battery 32.

Left and right magnetic sensors 36L and 36R are installed toward the front end of the body 12 of the vehicle 10 and a single magnetic sensor 36C is installed toward the rear end. The magnetic sensors 36 output signals indicating magnetic field strength.

A contact sensor (first detection unit) 40 is attached to the body 12 to detect contact of the vehicle 10 with buildings, paving stones, people and other obstacles and to detect upward lift of the cover 12b from the chassis 12a by the user, for example. The contact sensor 40 is explained in detail below.

A housing box installed near the middle of the chassis 12a houses a printed circuit board 42 carrying an electronic control unit (control unit; hereinafter called "ECU") 44, which comprises a microcomputer equipped with a CPU, I/O, memory (ROM, EEPROM and RAM) and other components.

The printed circuit board 42 is provided thereon, in the vicinity of the ECU 44, with an angular velocity sensor 46 that generates an output indicating angular velocity (yaw rate) about a center-of-gravity z-axis (gravity axis) of the vehicle 10, an acceleration sensor 50 that generates an output indicating acceleration acting on the vehicle 10 in orthogonal three-axis (x, y and z) directions, a direction sensor 52 that generates an output indicating absolute orientation in response to terrestrial magnetism, and a GPS sensor 54 that receives radio waves from GPS satellites and generates an output indicting current position of the vehicle 10.

Wheel speed sensors 56 that generate outputs indicating wheel speeds of the left and right rear wheels 16 are installed near the left and right rear wheels 16 of the vehicle 10. A lift sensor (second detection unit) 60 that detects upward lift (lift-up) of the cover 12b from the chassis 12a by the user, for example, is attached at a location between the chassis 12a and the cover 12b. The contact sensor 40 is also explained in detail below.

A current sensor 62 that generates an output indicating consumption of onboard battery 32 current is installed on the onboard battery 32.

The utility vehicle 10 is equipped with a main switch 64 for instructing start of work operation and an emergency stop switch 66 for instructing emergency stop, both of which are operable by the operator. In addition, the top of the cover 12b has a large cutaway in which a keyboard, touch panel or other input device 68 is installed for input of instructions and the like by the user, and a display 70 is installed near the input device 68. The input device 68 and the display 70 are connected to the ECU 44, and the display 70 displays working mode and various other information in accordance with instructions from the ECU 44.

Outputs of the magnetic sensors 36, contact sensor 40, angular velocity sensor 46 and other sensors, and the outputs of the main switch 64 and other switches are sent to the ECU 44. Based on these outputs, the ECU 44 applies power from the onboard battery 32 to the propulsion motors 26 and outputs control values to control navigation of the vehicle 10 by controlling operation of the propulsion motors 26.

The ECU 44 detects (recognizes) a working area (working range) AR from the outputs of the magnetic sensors 36 and accordingly applies power to the work motor 22 so as to service the working area AR.

Figure 3:
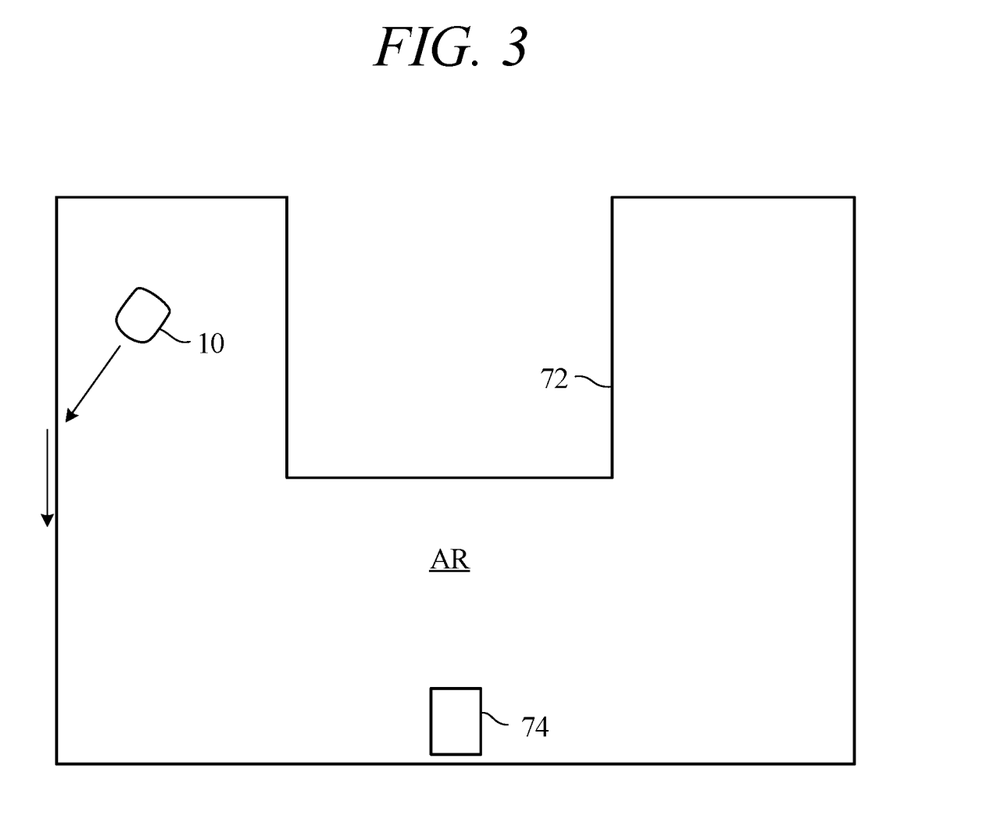
FIG. 3 is an explanatory view of a working area navigated by the autonomously navigating vehicle of FIG. 1.

As shown in FIG. 3, the working area AR is delineated by a boundary wire (electrical wire) 72 laid around its periphery (boundary). A charging station 74 is installed in the working area AR for charging the onboard battery 32 of the vehicle 10. (In FIG. 3, sizes of the vehicle 10 and so on are exaggerated.)

This invention is characterized by a suspension mechanism that connect the chassis 12a and the the cover 12b of the vehicle 10 incorporating the aforesaid configuration. This characterizing aspect is explained with reference to FIG. 4 and later drawings in the following.

Figure 4:
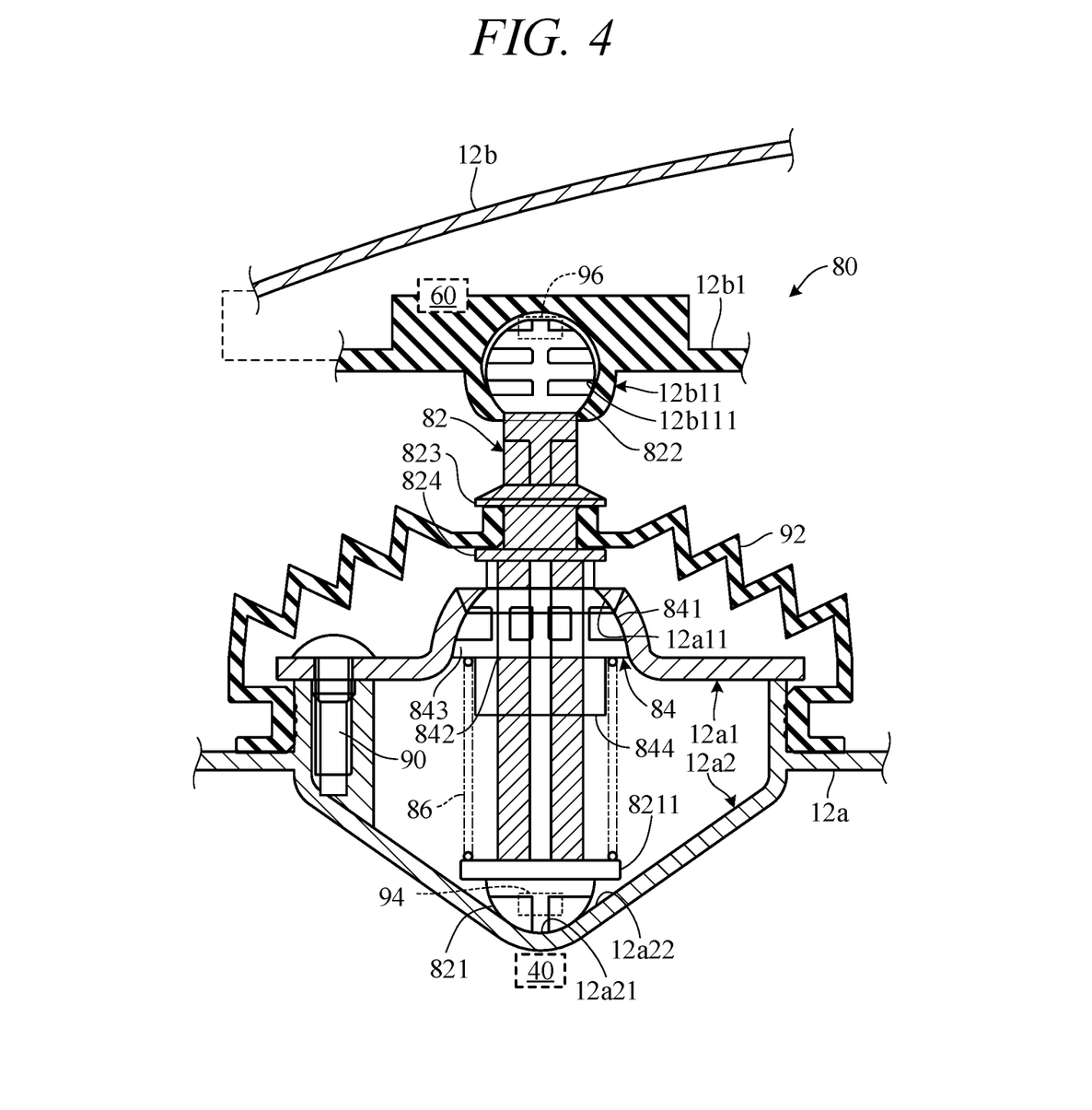
FIG. 4 is a schematic side sectional view of the suspension mechanism that attaches the cover to the chassis of the autonomously navigating vehicle of FIG. 1.
Figure 5:
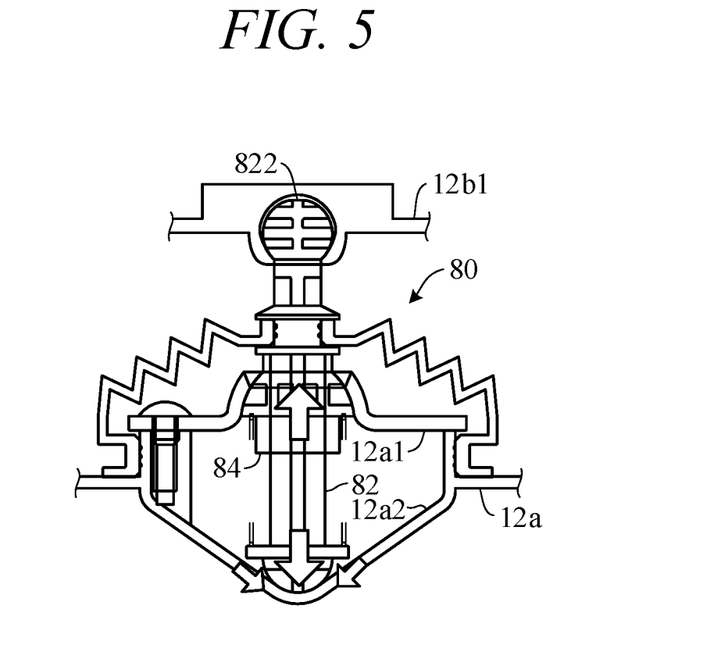
FIG. 5 is a side sectional view showing operation of the suspension mechanism of FIG. 4.
Figure 6:
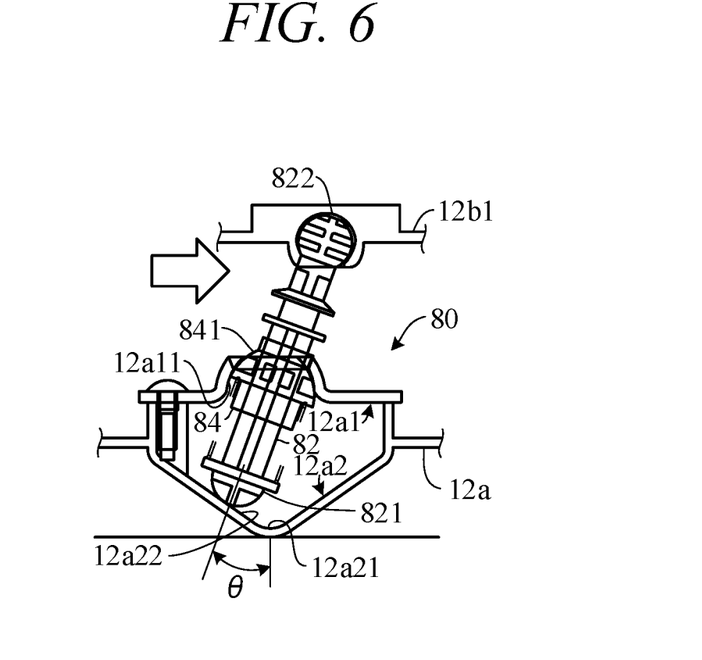
FIG. 6 is a side sectional view similarly showing operation of the suspension mechanism of FIG. 4.
Figure 7:
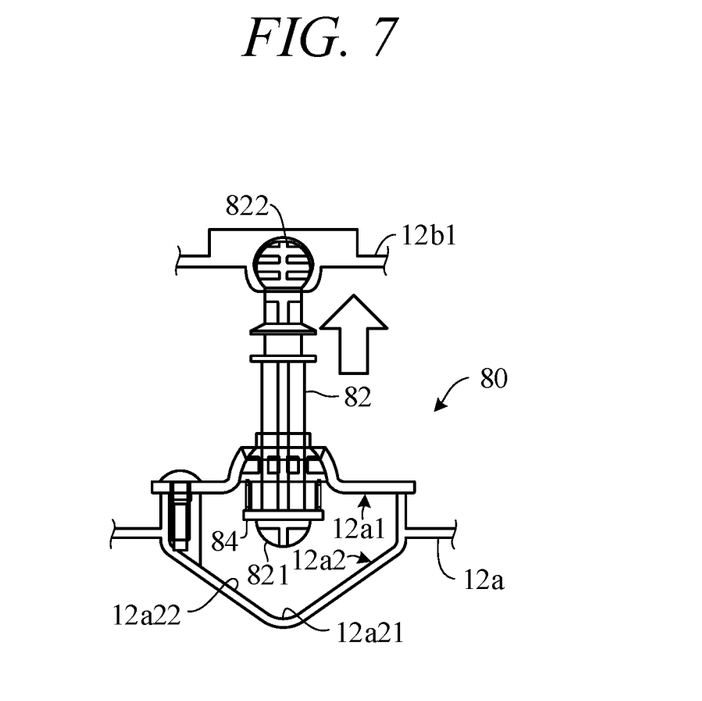
FIG. 7 is a side sectional views similarly showing operations of the suspension mechanism of FIG. 4.

FIG. 4 is a schematic side sectional view of the suspension mechanism, and FIGS. 5 to 7 are side sectional views similar to FIG. 4 showing operations of the suspension mechanism.

The suspension mechanism (hereinafter designated by reference numeral 80) is interposed in gravity axis direction between the chassis 12a and cover 12b and, as shown FIG. 4, is attached to a lock member 12b1 of the cover 12b at one end and at another end has at least one attachment shaft 82 to be attached to the chassis 12a.

Although not illustrated in the drawings, a total of three suspension mechanisms 80 are installed in the vehicle 10, one above the front wheels 14 and one above each of the left and right rear wheels 16.

Figure 1:
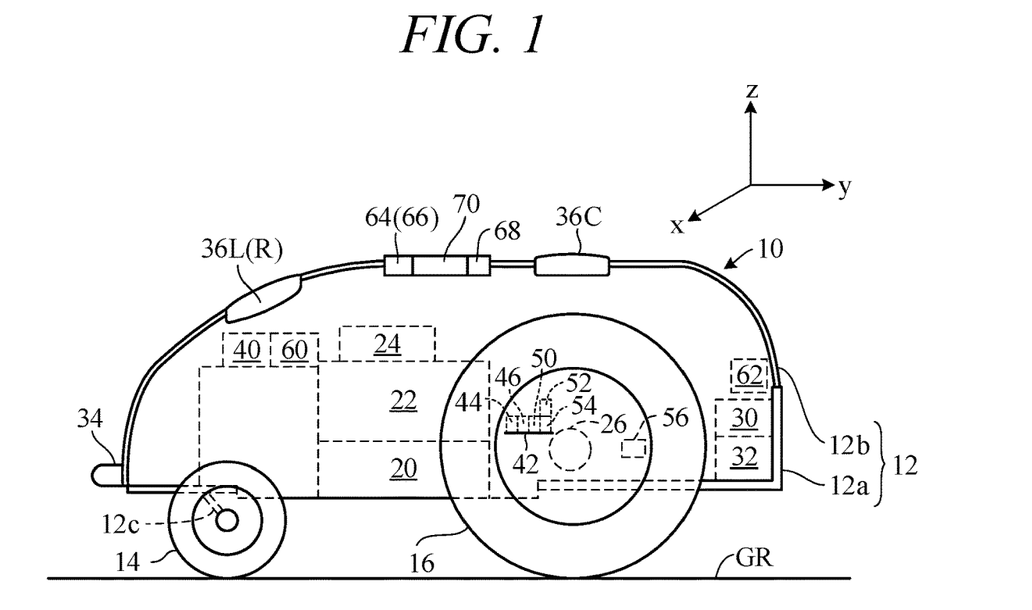
FIG. 1 is a conceptual diagram showing an overview of an autonomously navigating vehicle in accordance with this invention.
Figure 2:
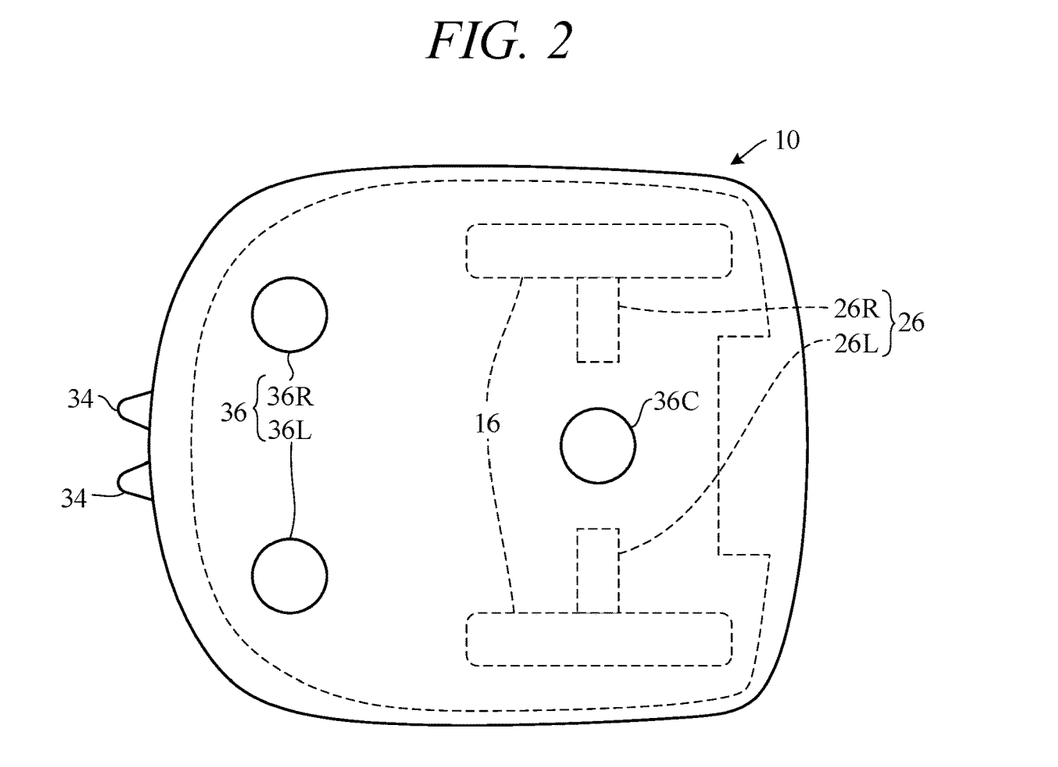
FIG. 2 is a top view of the autonomously navigating vehicle of FIG. 1.

As termed in this specification, "gravity axis direction" means direction of gravity axis (vertical axis direction; z-axis direction) in an orthogonal coordinate system when, as shown in FIG. 1, the vehicle 10 is resting on ground surface GR.

As illustrated, the suspension mechanism 80 comprises a tube member 84, a first attachment shaft retaining member 12a1, a shaft lower end portion 821, a second attachment shaft retaining member 12a2, and a biasing member 86.

Now to explain. The tube member 84 is movably attached to the attachment shaft 82, and is formed to have an outer peripheral surface 841 of approximately hemispherical shape surface in side view. The tube member 84 is formed in the middle with a through-hole 842 for movably attaching itself to the attachment shaft 82, more exactly for inserting the attachment shaft 82. In addition, the bottom part of the tube member 84 is reduced in diameter, and a rim 843 orthogonal to gravity axis direction is formed there to project horizontally.

The first attachment shaft retaining member 12a1, which is formed on the chassis 12a, has an inside surface 12a11 of approximately hemispherical shape surface in side view and is configured to swingably retain the attachment shaft 82 by abutting the outer peripheral surface 841 of approximately side-view hemispherical shape of the tube member 84 on the inside surface 12a11. The inside surface 12a11 of the first attachment shaft retaining member 12a1 is formed to have a shape corresponding to the outer peripheral surface 841 of the approximately side-view hemispherical shape of the tube member 84 (i.e., to have a complementary shape).

Thus the first attachment shaft retaining member 12a1 is connected with the tube member 84 by a ball joint structure, while, as shown in FIGS. 6 and 7, swingably (and movably) retains the attachment shaft 82 between the chassis 12a and the cover (more exactly, between the lock member 12b1 of the cover 12b and the chassis 12a located thereunder).

The shaft lower end portion 821 is provided at lowermost part of the attachment shaft 82 in the gravity axis direction and is configured to exhibit an approximately slip surface shape in side view. More explicitly, the slip surface shape of the shaft lower end portion 821 is formed to exhibit an approximately hemispherical shape surface in side view.

The top part of the shaft lower end portion 821 is expanded in diameter, and a rim 8211 formed there orthogonal to gravity axis direction to project in horizontal direction faces the rim 843 of the tube member 84 in gravity axis direction. The shaft lower end portion 821 can be provided integrally with the attachment shaft 82 or be provided as a separate body The second attachment shaft retaining member 12a2 is provided on the chassis 12a below the first attachment shaft retaining member 12a1 in gravity axis direction and is configured to have an inside surface comprising a vertex equivalent section 12a21 of approximately conical shape in side view and a slope equivalent section 12a22 continuous with the vertex equivalent section 12a21. The attachment shaft 82 is retained by abutting the shaft lower end portion 821 of approximately slip surface shape in side view on either the vertex equivalent section 12a21 or the slope equivalent section 12a22 of the second attachment shaft retaining member 12a2.

The inside surface of the second attachment shaft retaining member 12a2 comprises the slope equivalent section 12a22 of a shape corresponding to the shaft lower end portion 821 of approximately slip surface shape in side view, more specifically of hemispherical surface shape, more exactly of a shape on which the shaft lower end portion 821 can move smoothly, and the vertex equivalent section 12a21 capable of immobilizing the shaft lower end portion 821.

Thus the second attachment shaft retaining member 12a2 is configured to receive the shaft lower end portion 821 on one or the other of the vertex equivalent section 12a21 and the slope equivalent section 12a22, i.e., so as to retain the attachment shaft 82 with the shaft lower end portion 821 immobilized by the vertex equivalent section 12a21 or allowed to slip by the slope equivalent section 12a22.

The shape of the shaft lower end portion 821 is not limited to approximately hemispherical shape in side view but can be of any shape insofar as capable of moving smoothly on the slope equivalent section 12a22 of the second attachment shaft retaining member 12a2.

The biasing member 86 actually comprises a compression coil elastically interposed between the tube member 84 and the shaft lower end portion 821, specifically between the rim 843 of the tube member 84 and the rim 8211 of the shaft lower end portion 821 to urge the tube member 84 and shaft lower end portion 821 away from each other, i.e., so as to bias them vertically in gravity axis direction. A skirt 844 is provided under the rim 843 of the tube member 84 for aligning the biasing member 86 at the illustrated vertical position.

As shown in FIG. 4, the first attachment shaft retaining member 12a1 and second attachment shaft retaining member 12a2 are joined by screws or other joining members 90. For simplicity of illustration, only one joining member 90 is shown in FIG. 4.

As the joining members 90 suffice insofar as able to join the first attachment shaft retaining member 12a1 and second attachment shaft retaining member 12a2, they can instead be a caulking members or the like.

The suspension mechanism 80 is additionally equipped with a shaft upper end portion 822 and a third attachment shaft retaining member 12b11.

The shaft upper end portion 822 is provided at uppermost part of the attachment shaft 82 in the gravity axis direction and is configured to exhibit an approximately spherical surface shape surface in side view, actually to be formed as a sphere. The shaft upper end portion 822 can be provided integrally with the attachment shaft 82 or be provided as a separate body.

The third attachment shaft retaining member 12b11 is installed in the lock member 12b1 of the cover 12b and is in fact enclosed by the lock member 12b1. It has an inside surface 12b111 of approximately spherical surface shape in side view, and the attachment shaft 82 is swingably retained by abutting the shaft upper end portion 822 of approximately spherical surface shape in side view on the inside surface 12b111.

More specifically, a cavity is formed in the lock member 12b1 and the shaft upper end portion 822 is fitted in the cavity. The cavity is formed with the inside surface inside surface 12b111 of approximately spherical surface shape in side view corresponding (i.e., complementary) to the shaft upper end portion 822 of approximately spherical surface in side view.

Thus the third attachment shaft retaining member 12b11 and the shaft upper end portion 822 are connected by a ball joint structure, while, as shown in FIGS. 6 and 7, the attachment shaft 82 is swingably retained between the chassis 12a and the cover 12b (more exactly, between the chassis 12a and the lock member 12b1 of the cover 12b).

Further, as well illustrated in FIG. 4, a waterproofing boot 92 made of rubber or other waterproof material is bridged between the shaft upper end portion 822 of the attachment shaft 82 and both the attached position of the tube member 84 and the chassis 12a, whereby from the third attachment shaft retaining member 12b11 to the chassis 12a is covered by the boot 92.

For this, two vertically spaced-apart flanges 823 and 824 projecting in horizontal direction orthogonally to gravity axis direction are provided below the position where the attachment shaft 82 is provided with the third attachment shaft retaining member 12b11, and the boot 92 is attached between a recess formed between the flanges 823, 824 and an outer wall near the position where the first and second attachment shaft retaining members 12a1 and 12a2 of the chassis 12a are joined. As the waterproof boot 92 therefore covers from the third attachment shaft retaining member 12b11 across to the chassis 12a, invasion of moisture therebetween is prevented.

Moreover, a ferromagnetic magnetic body 94 comprising of a permanent magnet or the like is installed in the vicinity of the shaft lower end portion 821 of the attachment shaft 82, and a contact sensor (first detector) 40 comprising a magnetic sensor is installed at the gravity axis direction bottom of the chassis 12a. The suspension mechanism 80 is made of synthetic resin material, and the cover 12b and chassis 12a are also made of synthetic resin.

Output of the contact sensor 40 is sent to the ECU 44, where it is compared with an appropriate threshold to detect movement of the attachment shaft 82 in horizontal direction orthogonal to gravity axis direction, and displacement between the cover 12b and chassis 12a is detected based the comparison result to thereby detect contact of the vehicle 10 with and an obstacle.

In addition, a magnetic body 96 comprising a permanent magnet is installed in the vicinity of the shaft upper end portion 822 of the attachment shaft 82, and a lift sensor (second detector) 60 comprising a magnetic sensor is installed at the lock member 12b1.

Output of the lift sensor 60 is also sent to the ECU 44, where it is compared with an appropriate threshold value to detect movement of the attachment shaft 82 in gravity axis direction, and whether the cover 12b has been lifted upward in gravity axis direction by the user, for example, is detected based the comparison result.

Operation (action) of the suspension mechanism 80 according to this embodiment is explained with reference to FIGS. 5 to 7 in the following.

When no external force acts on the cover 12b relative to the chassis 12a, the suspension mechanism 80 acts such that the attachment shaft 82 is retained in initial state parallel to gravity axis direction, as shown in FIG. 5, because the tube member 84 and shaft lower end portion 821 are biased away from each other by the biasing member 86. When no external force acts on the cover 12b relative to the chassis 12a, the suspension mechanism 80 operates to retain the attachment shaft 82 in initial state parallel to gravity axis direction, as shown in FIG. 5, by action of the biasing member 86 urging the tube member 84 and shaft lower end portion 821 away from each other.

Namely, the suspension mechanism 80 operates to capture and immobilize the shaft lower end portion 821 at the vertex equivalent section 12a21 of the second attachment shaft retaining member 12a2, thereby retaining the attachment shaft 82 by means of the vertex equivalent section 12a21.

On the other hand, as shown in FIG. 6, when a horizontal external force acts on the cover 12b relative to the chassis 12a, such as when the vehicle 10 strikes an obstacle, the suspension mechanism 80 operates, during swing of the upper end of the attachment shaft 82 by the first attachment shaft retaining member 12a1 as shown in FIG. 6, to retain the attachment shaft 82 as the shaft lower end portion 821 of slip shape escapes from the vertex equivalent section 12a21 of the second attachment shaft retaining member 12a2 and moves along the slope equivalent section 12a22.

Further, when the user, for example, applies an external force to move the cover 12b in gravity axis direction upward relative to the chassis 12a, the suspension mechanism 80 operates, as shown in FIG. 7, to move the attachment shaft 82 upward in gravity axis direction until the tube member 84 moves relatively downward along the attachment shaft 82 to abut on the first attachment shaft retaining member 12a1 at limit position.

This rise limit of the attachment shaft 82 is determined by axial lengths of the attachment shaft 82 and tube member 84. Further, swing angle $\theta$ of the attachment shaft 82 in the second attachment shaft retaining member 12a2 (FIG. 6) is limit of angle of abutment between the tube member 84 and first attachment shaft retaining member 12a1, so that desired swing angle can be realized by appropriately deciding shape of these members.

As set out in the foregoing, this embodiment relates to the vehicle 10 equipped with the chassis 12a, the cover 12b, and the suspension mechanism 80 interposed between the chassis 12a and the cover 12b (specifically, therebetween in gravity axis direction) through the lock member 12b1 at one end, and having at least one attachment shaft 82 attached to the chassis 12a at the other end, which vehicle runs (autonomously runs) on drive wheels (rear wheels 16 driven by the propulsion motors 26) attached to the chassis 12a, characterized in that: the suspension mechanism 80 comprising: the tube member 84 that is movably attached to the attachment shaft 82 and includes the outer peripheral surface 841 of approximately hemispherical shape (more exactly, approximately hemispherical shape surface in side view), the first attachment shaft retaining member 12a1 having the inside surface 12a11 of approximately hemispherical shape surface in side view and provided on the chassis 12a to swingably retain the attachment shaft 82 with the outer peripheral surface 841 of the tube member 84 abutted on the inside surface 12a11, the shaft lower end portion 821 of approximately slip surface shape (more exactly, approximately slip surface shape in side view) provided at lowermost part of the attachment shaft 82 (more exactly, at lowermost part of the attachment shaft 82 in the gravity axis direction), the second attachment shaft retaining member 12a2 provided on the chassis 12a below the first attachment shaft retaining member 12a1 (more exactly, below the first attachment shaft retaining member 12a1 in the gravity axis direction) and having the inside surface formed by the vertex equivalent section 12a21 of approximately conical shape (more exactly, of approximately conical shape in side view) and the slope equivalent section 12a22 continuous with the vertex equivalent section to retain the attachment shaft 82 with the shaft lower end portion 821 abutted onto at least one of the vertex equivalent section 12a21 and the slope equivalent section 12a22, and the biasing member 86 elastically interposed between the tube member 84 and the shaft lower end portion 821 to bias the tube member 84 and the shaft lower end portion 821 away from each other, by which configuration the chassis 12a and the cover 12b can be reliably connected through the suspension mechanism 80 and retaining performance of the attachment shaft 82 can be enhanced.

Moreover, a configuration is adopted wherein the biasing member 86 that elastically biases the tube member 84 and the shaft lower end portion 821 away from each other abuts the shaft lower end portion 821 of slip surface shape onto one or the other of the vertex equivalent section 12a21 and the slope equivalent section 12a22, normally onto the vertex equivalent section 12a21, thereby retaining the attachment shaft 82, which configuration effectively inhibits vibration of the cover 12b and enables reduction of vehicle running noise.

Moreover, since displacement of the cover 12b moves the shaft lower end portion 821 obliquely upward along the slope equivalent section 12a22 while compressing the biasing member 86, cushioning performance at time of collision is enhanced, and restoring force can be promptly obtained during ensuing restoration because the shaft lower end portion 821 moves obliquely downward along the slope under gravitational force and reaction force of the biasing member 86.

Further, a structure is adopted to include the shaft upper end portion 822 of approximately spherical surface shape (more exactly, approximately spherical surface shape in side view) provided at uppermost part of the attachment shaft 82 (more exactly, at uppermost part of the attachment shaft 82 in the gravity axis direction) and the third attachment shaft retaining member 12b11 having the inside surface 12b111 of approximately spherical surface shape (more exactly, approximately spherical surface shape in side view) and provided in the lock member 12b1 of the cover 12b to swingably retain the attachment shaft 82 by abutting the shaft upper end portion 822 on the inside surface 12b111, by which configuration retaining performance of the attachment shaft 82 can be further enhanced and vehicle running noise further reduced owing to still better suppression of cover 12b vibration.

Moreover, a configuration is adopted that swingably restrains the attachment shaft 82 between the chassis 12a and the cover 12b by a ball joint structure of approximately spherical surface shape, whereby the cover 12b can be restored to initial state no matter to what angle it is displaced relative to horizontal.

Furthermore, the shaft lower end portion 821 is configured to exhibit approximately hemispherical surface shape (more exactly, approximately hemispherical surface shape in side view), so that, in addition to realizing the aforesaid effects, the shaft lower end portion 821 can be smoothly moved on the slope equivalent section 12a22 of the second attachment shaft retaining member 12a2.

Further, a configuration is adopted wherein the first attachment shaft retaining member 12a1 and the second attachment shaft retaining member 12a2 are joined by the joining members 90, so that, in addition to realizing the aforesaid effects, fabrication can be simplified because the first attachment shaft retaining member 12a1 and the second attachment shaft retaining member 12a2 can be fabricated separately.

Moreover, a configuration is adopted wherein the boot 92 is bridged between a location between the shaft upper end portion 822 of the attachment shaft 82 and the attached position of the tube member 84 and the chassis 12a, so that, in addition to realizing the aforesaid effects, invasion of moisture between the third attachment shaft retaining member 12b11 and the chassis 12a can be prevented.

Further, a configuration is adopted to include the first detector 40 installed near of the attachment shaft 82 to detect contact with an obstacle by detecting displacement between the cover 12b and the chassis 12a based on horizontal movement of the attachment shaft 82 orthogonal to gravity axis direction, so that, in addition to realizing the aforesaid effects, contact with obstacles and the like can detected.

Further, a configuration is adopted to include the second detector 60 installed near of the attachment shaft 82 to detect upward lift of the cover 12b in gravity axis direction based on movement of the attachment shaft 82 in gravity axis direction, whereby, in addition to realizing the aforesaid effects, that the cover 12b was lifted can be detected.

Although in the foregoing the vehicle 10 is exemplified as an autonomously navigating vehicle that navigates autonomously while detecting magnetic field of the boundary wire 72 laid around the working area AR, the vehicle 10 is not limited to this type of autonomously navigating vehicle.

Moreover, although the vehicle 10 has been described as a lawn-mowing vehicle, this invention is not limited to such an application and can also be applied to other autonomously navigating vehicles capable of driving autonomously.

Further, although the first and second sensors 40 and 60 were described as magnetic sensors, this is not a restriction, and the first and second sensors can be of any type insofar as capable of detecting physical displacement of the attachment shaft 82.

INDUSTRIAL APPLICABILITY

The autonomously navigating vehicle according to this invention can be advantageously applied as an unmanned autonomously navigating vehicle.

DESCRIPTION OF SYMBOLS 10 autonomously navigating vehicle (vehicle), 12 body, 12a chassis, 12a1 first attachment shaft retaining member, 12a11 inside surface, 12a2 second attachment shaft retaining member, 12a21 vertex equivalent section, 12a22 slope equivalent section, 12b cover, 12b1 lock member, 12b11 third attachment shaft retaining member, 12b111 inside surface, 14 front wheels, 16 rear wheels, 20 blade, 22 electric motor (work motor), 24 blade height regulating unit, 26 electric motor (propulsion motor), 30 onboard charging unit, 32 onboard battery, 34 battery charging terminals, 36 magnetic sensors, 40 contact sensor, 44 electronic control unit (ECU), 46 angular velocity sensor, 50 acceleration sensor, 52 direction sensor, 54 GPS sensor, 56 wheel speed sensor, 60 lift sensor, 62 current sensor, 68 input device, 70 display, 72 boundary wire, 74 charging station, 80 suspension mechanism, 82 attachment shaft, 821 shaft lower end portion, 8211 rim, 822 shaft upper end portion, 823, 824 flanges, 84 tube member, 841 outer peripheral surface, 843 rim, 90 joining member, 92 boot, 94, 96 magnetic body, AR working area

The invention claimed is:

1. An autonomously navigating vehicle equipped with a chassis, a cover, and a suspension mechanism interposed between the chassis and the cover through a lock member at one end, and having at least an attachment shaft attached to the chassis at other end, which vehicle runs on drive wheels attached to the chassis, wherein the suspension mechanism comprises:

a tube member that is movably attached to the attachment shaft and includes an outer peripheral surface;

a first attachment shaft retaining member having an inside surface and provided on the chassis to swingably retain the attachment shaft with the outer peripheral surface of the tube member abutted on the inside surface;

a shaft lower end portion provided at lowermost part of the attachment shaft;

a second attachment shaft retaining member provided on the chassis below the first attachment shaft retaining member and having an inside surface formed by a vertex equivalent section and the slope equivalent section continuous with the vertex equivalent section to retain the attachment shaft with the shaft lower end portion abutted onto at least one of the vertex equivalent section and the slope equivalent section; and a biasing member elastically interposed between the tube member and the shaft lower end portion to bias the tube member and the shaft lower end portion away from each other.

2. The vehicle according to claim 1, further including:

a shaft upper end portion provided at uppermost part of the attachment shaft; and a third attachment shaft retaining member having an inside surface and provided in the lock member of the cover to swingably retain the attachment shaft by abutting the shaft upper end portion on the inside surface.

3. The vehicle according to claim 1, wherein the shaft lower end portion is configured to exhibit an approximately hemispherical surface shape.

4. The vehicle according to claim 1, wherein the first attachment shaft retaining member and the second attachment shaft retaining member are joined by a joining member.

5. The vehicle according to claim 2, wherein a boot is bridged between a location between the shaft upper end portion of the attachment shaft and the attached position of the tube member and the chassis.

6. The vehicle according to claim 1, further including:

a first detector installed near of the attachment shaft to detect contact with an obstacle by detecting displacement between the cover and the chassis based on horizontal movement of the attachment shaft orthogonal to gravity axis direction.

7. The vehicle according to claim 1, further including:

a second detector installed near the attachment shaft to detect upward lift of the cover in gravity axis direction based on movement of the attachment shaft.

8. The vehicle according to claim 1, wherein the chassis is provided with a lawnmower blade.

* * * * *